United States Patent [19]
Rademacher et al.

[11] Patent Number: 5,868,237
[45] Date of Patent: Feb. 9, 1999

[54] ESCROW VENDING DISPENSER

[75] Inventors: Darrell G. Rademacher, 4253 Dewey Dr., New Port Richey, Fla. 34652; Douglas A. Hoyt, Dryden, N.Y.

[73] Assignee: Darrell G. Rademacher, Port Richey, Fla.

[21] Appl. No.: 768,208

[22] Filed: Dec. 17, 1996

Related U.S. Application Data

[60] Provisional application No. 60/010,552 Jan. 25, 1996.

[51] Int. Cl.$^6$ ..................................................... G07F 11/04
[52] U.S. Cl. .......................................... 194/217; 221/197
[58] Field of Search ..................................... 194/206, 207, 194/217, 218; 705/39, 41; 221/197, 198

[56] References Cited

U.S. PATENT DOCUMENTS

| | | | |
|---|---|---|---|
| 4,498,570 | 2/1985 | King et al. | 194/217 |
| 4,602,332 | 7/1986 | Hirose et al. | 194/206 X |
| 4,993,587 | 2/1991 | Abe | 221/21 |
| 5,409,092 | 4/1995 | Itako et al. | 194/210 |
| 5,696,908 | 12/1997 | Muehlberger et al. | 705/39 |

*Primary Examiner*—F. J. Bartuska
*Attorney, Agent, or Firm*—Trapani & Molldrem

[57] ABSTRACT

An escrow vending machine has a secure, locking cabinet; a dispenser for cards or other merchandise; a bill acceptor, coin acceptor or similar cash acceptor; and a controller board within the cabinet and connected to the dispenser and to the cash acceptor. The dispenser contains a supply of prepaid telephone cards or other merchandise, and dispenses them one at a time in response to a control signal. The cash acceptor accepts and registers units of cash, e.g., dollars, and generates a pulse or other signal for each unit accepted. The controller board has an input that receives the cash signal from the cash acceptor and an output supplying the control signal to the dispenser. An escrow counter or register accumulates an escrow count of the pulses or cash signals. This enables the controller board to supply the control signal when the count in the escrow register equals or exceeds a preset number that represents a price or value. When this happens, the controller board stores the difference between the escrow count and preset number as a new escrow count. Then, when additional units of cash are inserted into the cash acceptor, and the latter produces additional cash signals, the escrow register counts up to increase the new escrow count. This enables the controller board to supply the control signal again when the new escrow count again equals or exceeds the preset number.

14 Claims, 4 Drawing Sheets

ESCROW VENDING DISPENSER

This application claims the benefit of provisional application Ser. No. 60/010,552, filed Jan. 25, 1996.

BACKGROUND OF THE INVENTION

This invention relates to dispensing mechanisms, and is more particularly directed to devices for vending items, e.g., pre-paid debit cards (such as telephone long-distance calling cards) when a customer has deposited a predetermined amount of money into a coin and/or currency acceptor device.

Self-service card vending machines have become popular at locations where customers are likely to need to make local, regional, or long-distance calls. These machines are frequently located at airports, convenience stores, college student centers, and near pay telephone banks. The cards typically carry a toll-free access number, and a code or PIN number that the customer also dials for authority to connect to a distant party. Each card has a unique PIN number, which must be activated at the long-distance company at or before the time that the card is sold to the customer. These cards are variously referred to as phone cards, long distance cards, prepaid phone cards, debit cards, or telecards. These cards typically come in denominations such as $10, $20, or $50, which can correspond to 30 minutes, 60 minutes, or 150 minutes of long-distance calling time, respectively.

The current state of the art in card vending mechanisms requires the card dispenser to be interfaced with a main control board that is in turn connected to the currency acceptor or coin acceptor. This requires the vending company to purchase three separate parts, and to hook-up the three parts, namely the money acceptor, the controller board, and the card vender. The card venders are set up to dispense a single debit card when the controller provides the dispenser with a single impulse. This limits the flexibility of the device, and causes a problem when the customer inserts more value than the money required to purchase a single card.

The vending machine market has many types of dispenser mechanisms that are interfaced to a main control board. However, no one in the vending machine market incorporates a special, miniature controller board within the dispenser to solve the problem of having an external controller board.

SUMMARY OF THE INVENTION

This invention involves an escrow vending dispenser, which is a mechanism such as is used for dispensing phone cards, stamps, lottery tickets, tokens, currency and coins, merchandise, or any other product that is to be dispensed when the customer inserts the appropriate amount of money or other means of credit. This mechanism typically receives a signal from a coin mechanism or bank note acceptor, or from a credit/debit card reader, to signal the mechanism to dispense a unit of product, e.g., one phone card.

In a preferred embodiment of this invention, the dispenser has an on-board microprocessor controller board with a row of DIP switches for selecting the vend price and other definable functions. An example is a row of eight "ON/OFF" DIP switches mounted on a printed circuit board. The row of eight switches are used to select the dispense price from $1 to $31 by selecting the appropriate switches to achieve the selected vend price. For example, to select a $20 vend price, one would select DIP switches number three and five (#3 and #5).

In operation the escrow vending dispenser would count the number of signals (i.e., impulses) that are received into the escrow vending dispenser controller board microprocessor. Once the count reaches a preset vend price, a product such as a phone card, as an example, could be dispensed. During the dispense cycle of the dispenser, an acknowledge signal for the "empty" or "inhibit" line is sent to the coin mechanism, note acceptor, or credit/debit card system so as not to allow any further coins or bank notes or credit/debit card signals to be sent to the escrow vending dispenser until the product, such as the phone card, is dispensed.

Another feature of the invention is that the escrow vending dispenser microprocessor memory of the controller is able to store received signals or pulses in "escrow" for the next dispense or vend of a product, e.g., phone card. In operation, the escrow vending dispenser can accept multiple pulses or signals that are in excess of the preselected vend set price as set by the DIP switches on the control board of the dispenser. For example, if the vend price was for $10.00, and the customer inserted a twenty dollar bill or note ($20.00) the controller will receive, e.g., twenty pulses, and the dispenser will dispense two of the products, e.g., two phone cards, two lottery tickets, etc.

Another feature of the invention is that the escrow vending dispenser microprocessor memory of the controller can be programmed by selection of one of the DIP switches either to hold the card between the exit rollers to avoid the card falling on the floor or, in the opposite switch setting, to ensure the card exits completely from the card mechanism. In the second case the card can drop into a receptacle. This flexibilty is an important feature, and can be valuable when the dispenser mechanism is placed tight up against the door containing the exit card slot.

The remaining DIP switches on the escrow vending dispenser can be used to select how many times that the mechanism will attempt to retry to dispense a jammed product such as a phone card, lottery ticket, postage stamp, etc.

The escrow vending dispenser utilizes a gear drive series of rollers to eject the product. A "paddle wheel" on a drive shaft is used to lift up and move the product forward into the path of the exit rollers to dispense the product. The system uses a series of gears to turn the rollers at the appropriate speeds. The paddle wheel drive shaft turns at about ⅓ the speed of the exit shaft rollers. A set of optosensors are used to confirm that the paddle wheel shaft has lifted up and moved the product forward into the drive exit rollers. In the event of two products, e.g., two phone cards, being dispensed, the second optosensor senses this and reverses the series of rollers.

At the heart of this invention is a dispenser mechanism for dispensing phone cards or other type cards or flat products, such as postage stamps, post cards, lottery tickets, subway fare cards, or the like, and that has a microprocessor controller board with a program that will count the number of pulses received until that count matches a preset number (as set on the DIP switches). Once that preset number of pulses is reached, the dispenser device will dispense a product. Any additional pulses (representing additional money inserted into the coin or currency acceptor) will be stored in escrow, until further impulses are received to equal the purchase price of another product. The DIP switches, i.e., series of DIP switches, select the vend price that will be required to have the device dispense a unit of product. The escrow vending dispenser is a fully self-contained mechanism that has the mechanical dispenser mechanism combined and integrated with the controller board in a single, complete assembly.

In a preferred embodiment, the controller board fits on the chassis of the dispenser mechanism, and the DIP switches can be accessed by removing a panel. The controller board requires a 24 volt input, which is rectified and provided at the appropriate levels to the internal integrated circuit devices.

The above and many other objects, features, and advantages of this invention will be better understood from the ensuing detailed description of a preferred embodiment, which should be read in conjunction with the accompanying Drawing.

DETAILED DESCRIPTION OF THE PREFERRED EMBODIMENT

Figure 1A:
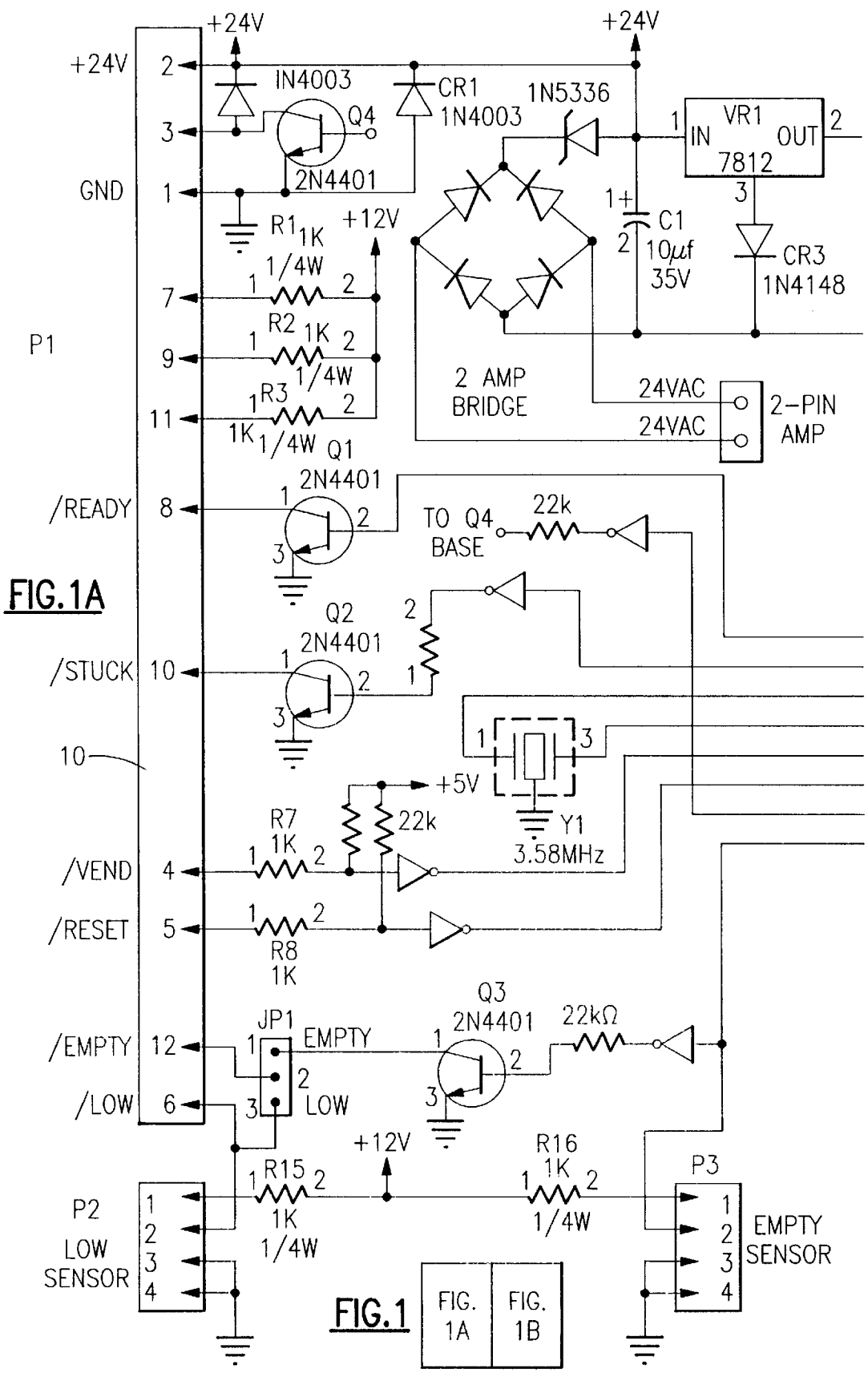
FIG. 1, formed of FIGS. 1A and 1B, is a circuit diagram of the controller board according to a preferred embodiment of this invention.
Figure 1B:
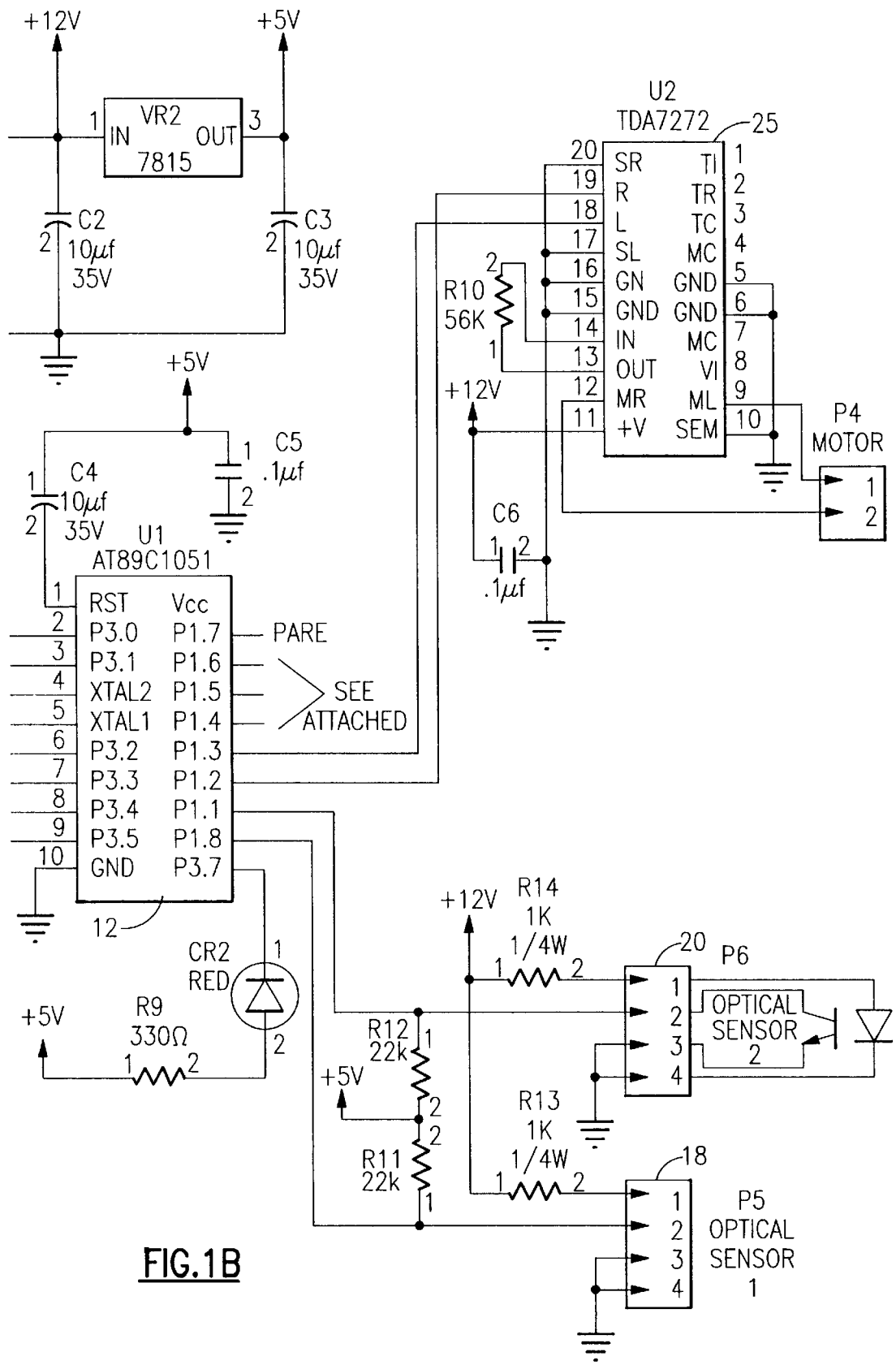
Figure 2:
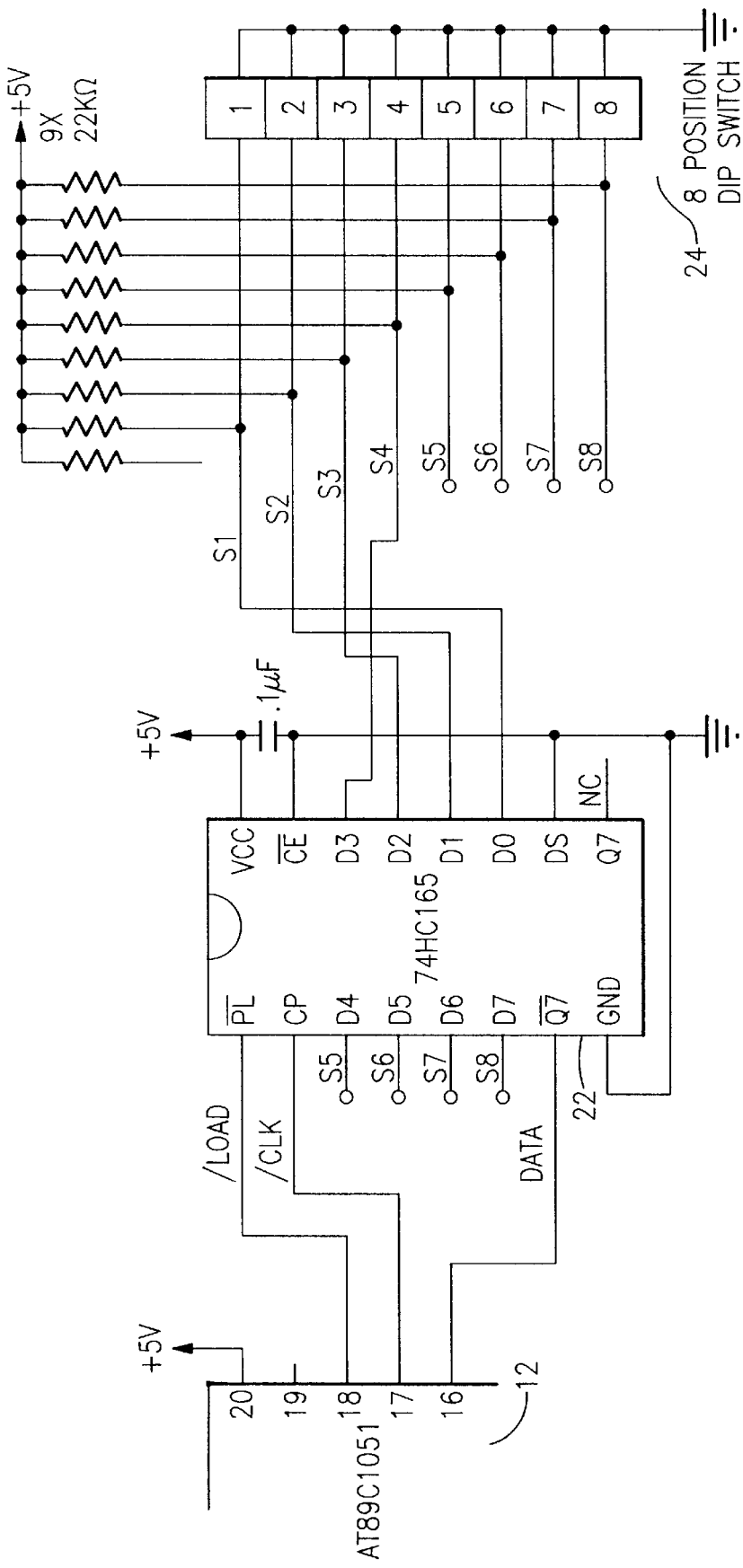
FIG. 2 is a circuit diagram of the dispenser board price/retry circuitry of this embodiment.

With reference to the Drawing, FIG. 1 shows the circuit board 42 employed in an escrow vending mechanism of embodiment of this invention, in which an input/output terminal strip 10 has inputs and outputs, e.g., /READY, /STUCK, /VEND, /RESET, /EMPTY, and /LOW, as shown. This strip 10 is coupled to a microprocessor 12, which has various inputs and outputs. There are associated sensors, including low product sensor 14, empty sensor 16 and optical sensors 18 and 20 to detect any problems in operation of the dispenser. As shown in FIG. 2, the microprocessor is coupled by an integrated circuit 22 to a DIP switch arrangement 24, here with eight DIP switches. The integrated circuit 22 controls the price (that is, the number of impulses) required for vending the product, and the number of retries in the case of a stuck product signal, depending on the particular settings of the DIP switches 24. Another integrated circuit 25 supplies motor control signals.

In this arrangement, the escrow vending mechanism can be connected easily to any convenient coin, currency, or credit/debit card acceptor, using a minimum number of standard conductors. The unit price can easily be changed by the operator, for example at the time when reloading the phone cards or other articles into the vender. Because the controller board is incorporated into the dispenser or vender, installation can be accomplished by the operator without special tools. Also the dispenser, which includes the controller board, is no larger in size than a standard dispenser that does not include a controller, and for which an external controller has to be provided.

Figure 3:
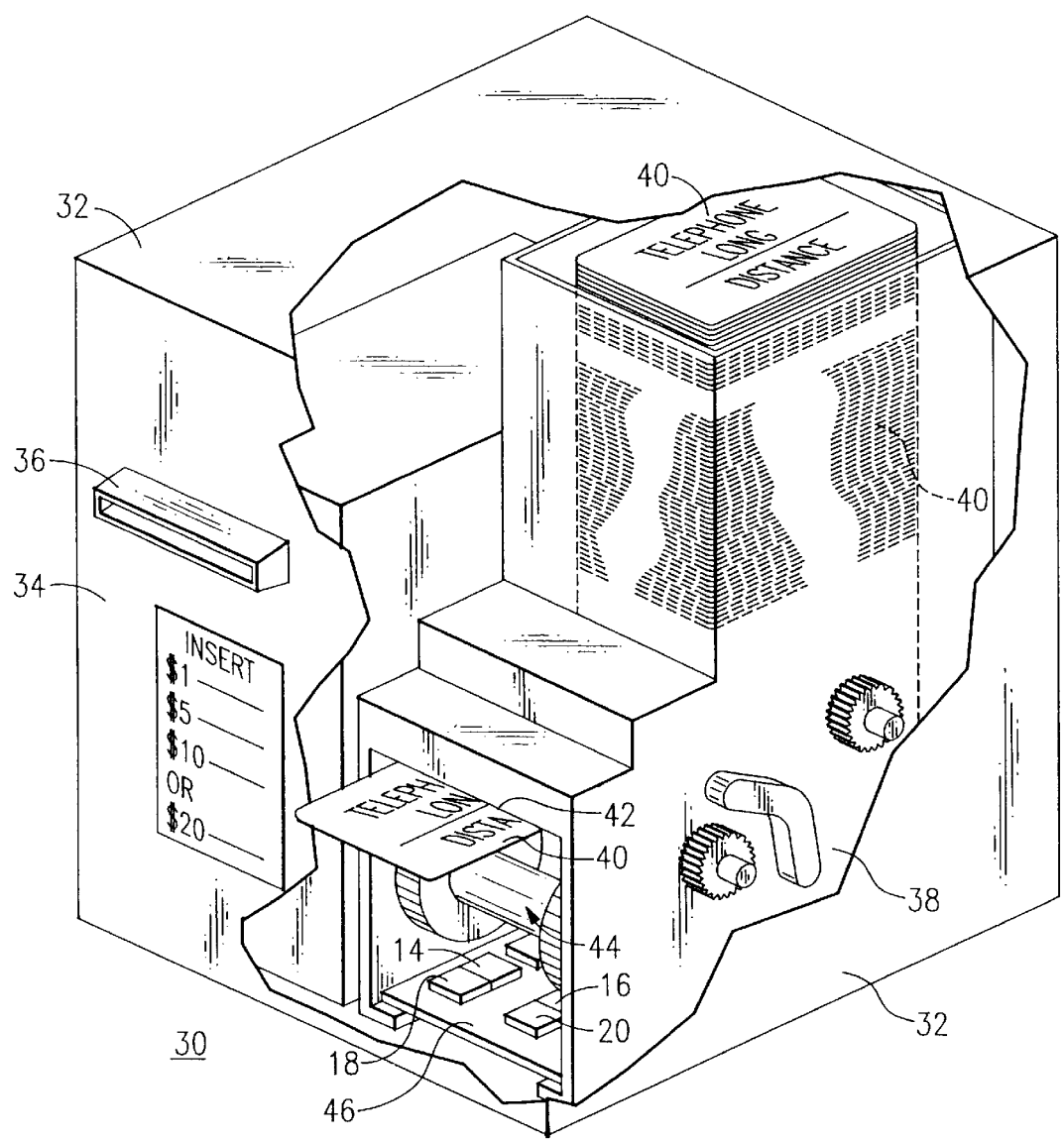
FIG. 3 is aschematic view of a phone card vending device according to this embodiment.

FIG. 3 shows one example of a telephone card dispensing arrangement 30, which can fit compactly on a countertop in a store, motel, or other establishment. The arrangement 30 has a lockable, secure cabinet or housing 32, here shown cut away and partly in ghost to reveal a currency acceptor 34 inside.

The currency acceptor 34 is configured to accept U.S. paper currency, for example, $1, $5, $10, and $20 Federal Reserve Notes (this could be configured alternately to accept coins also, or to accept Canadian, British, German, Japanese or other foreign currency). The acceptor 34 has an acceptor slot 36 into which bills are inserted.

Alongside the currency acceptor 34 inside the housing is a card dispenser 38, here configured to dispense telephone long distance debit cards 40, i.e., prepaid phone cards, from a stack of these cards 40. The card dispenser automatically ejects the cards 40 one at a time when the predetermined amount of money (for example $10) has been inserted into the currency acceptor. At that time one card 40 is ejected from an ejection slot 42 and dispensed to the customer. An internal mechanism 44 in the card dispenser 38 pushes out the cards one at a time, and also includes an arrangement which can be rocked back and forth to dislodge a stuck card. At the base of the card dispenser 38 is a controller board 46, which is electrically coupled to the card dispenser internal mechanism 44 and to the currency acceptor 34. This board 46 contains the elements shown in FIGS. 1 and 2, and the DIP switch arrangement 24 is disposed underneath so that it is accessible from below after the housing 32 is opened or removed.

The mechanism 44 drives exit rollers 48 which push the card 40 out through the exit slot. The mechanism 44 is interconnected to the controller board such that a switch element, e.g., on the DIP switch 24, can be set in either of two positions to select two dispensing modes. In one switch position, the rollers 48 dispense the card 40 completely. In the other switch position, the rollers 48 are halted just before the card is completely out the slot, and these rollers 48 continue to grip the end of the card 40 until the customer grasps it to remove it. This keeps the card from inconveniently falling onto the floor or behind the equipment.

It should be understood that many items other than phone cards can be dispensed in this arrangement, for example, lottery tickets or cards; bus, train, or subway tickets; postal stamps, foreign currency, etc. Also, the currency acceptor could be replaced with a debit card reader to accept value from a debit card. Also, the escrow vending dispenser can include a customer selector means, e.g., pushbuttons, to permit the customer to select between two or more dispensers within the cabinet, i.e., between $5.00 and $10.00 phone cards.

There are many variations of the escrow vending dispenser which incorporate the features and advantages mentioned above. While the invention has been described with reference to a preferred embodiment, it should be recognized that the invention is not limited to that precise embodiment. Rather, many modifications and variations would present themselves to persons skilled in the art without departing from the scope and spirit of the invention, as defined in the appended claims.

We claim:

1. An escrow vending machine which accepts units of cash inserted by a customer and when a cash amount equaling a predetermined value has been so inserted, dispenses to the customer an article having a predetermined customer price, the escrow vending machine comprising:

a cabinet having an interior;

an article dispenser situated in the interior of said cabinet containing a supply of said articles and including means for dispensing said articles one at a time in response to a control signal applied to a control terminal thereof;

a cash acceptor disposed in the interior of said cabinet for accepting units of cash and having an acceptor slot accessible through a penetration in said cabinet to accept and register said units of cash; said bash acceptor including means to generate a cash signal for each said unit of cash accepted in said cash acceptor; and a controller board contained within said article dispenser, with the article dispenser and the control board being mechanically combined and integrated to form a fully self-contained mechanism, such that said cash acceptor is connected directly to said fully self-contained article dispenser mechanism, and having an input coupled to receive the cash signal from said cash acceptor and to actuate said article dispenser, said controller board including escrow means for accumulating an escrow count of occurrences of said cash signal and for enabling the controller board to actuate said dispenser when the count in said escrow meats equals or exceeds a preset count in said escrow means, and maintaining a difference between said escrow count and said predetermined number as a new escrow count; such that when additional units of cash are received in said cash acceptor and the latter produces additional cash signals, the escrow means continues to increase the new escrow count and enables the controller board to again actuate the article dispenser when the new escrow count again equals or exceeds said predetermined number.

2. The escrow vending machine according to claim 1 wherein said cash acceptor accepts currency in at least one denomination and said cash signal generating means produces said cash signals as pulses corresponding to the units of said currency.

3. The escrow vending machine according to claim 2 wherein said cash acceptor includes a bill acceptor capable of accepting notes in a plurality of denominations.

4. The escrow vending machine according to claim 1 wherein said article dispensing means includes a card dispenser holding a stack of cards to be dispensed one at a time, said cards all having the same predetermined value.

5. The escrow vending machine according to claim 1, wherein said controller board further includes a low product sensor, a dispenser-empty sensor, and an additional optical sensor.

6. An escrow vending machine which accepts units of cash inserted by a customer and when a cash amount equaling a predetermined value has been so inserted, dispenses to the customer an article having a predetermined customer price, the escrow vending machine comprising:
   a cabinet having an interior;
   an article dispenser situated in the interior of said cabinet containing a supply of said articles and including means for dispensing said articles one at a time in response to a control signal applied to a control terminal thereof, said article dispenser including a card dispenser holding a stack of cards to be dispensed one at a time, and said card dispenser including exit rollers that turn to dispense the cards, and means to halt the exit rollers near the end of travel of the card when said card is dispensed so as to hold an end of the card and prevent the card from falling from the dispenser until grasped and pulled out by the customer;
   a cash acceptor disposed in the interior of said cabinet for accepting units of cash and having an acceptor slot accessible through a penetration in said cabinet to accept and register said units of cash; said cash acceptor including means to generate a cash signal for each said unit of cash accepted in said cash acceptor; and
   a controller board integrated into said article dispenser, so that said cash acceptor is connected directly to said article dispenser the controller board having an input coupled to receive the cash signal from said cash acceptor and an output terminal supplying said control signal to said article dispenser, said controller board including escrow means for accumulating an escrow count of occurrences of said cash signal and for enabling the controller board to supply said control signal when the count in said escrow means equals or exceeds a preset count in said escrow means, and maintaining a difference between said escrow count and said predetermined number as a new escrow count; such that when additional units of cash are received in said cash acceptor and the latter produces additional cash signals, the escrow means continues to increase the new escrow count and enables the controller board to again supply said control signal when the new escrow count again equals or exceeds said predetermined number.

7. An escrow vending machine which accepts units of cash inserted by a customer and when a cash amount equaling a predetermined value has been so inserted, dispenses to the customer an article having a predetermined customer price, the escrow vending machine comprising:
   a cabinet having an interior:
   an article dispenser situated in the interior of said cabinet containing a supply of said articles and including means for dispensing said articles one at a time in response to a control signal applied to a control terminal thereof, said article dispenser including a card dispenser holding a stack of cards to be dispensed one at a time, said cards all having the same predetermined customer price, and said card dispenser including exit rollers that turn to dispense the cards, and means to halt the exit rollers when said card is dispensed so as to hold an end of the card and prevent the card from falling from the dispenser until grasped by the customer;
   a cash acceptor disposed in the interior of said cabinet for accepting units of cash and having an acceptor slot accessible through a penetration in said cabinet to accept and resister said units of cash; said cash acceptor including means to generate a cash signal for each said unit of currency accepted in said cash acceptor; and
   a controller board disposed within said cabinet having an input coupled to receive the cash signal from said cash acceptor and an output terminal supplying said control signal to said article dispenser, said controller board including escrow means for accumulating an escrow count of occurrences of said cash signal and for enabling the controller board to supple said control signal when the count in said escrow means equals or exceeds a preset count in said escrow means, and maintaining a difference between said escrow count and said predetermined number as a new escrow count; such that when additional units of cash are received in said cash acceptor and the latter produces additional cash signals, the escrow means continues to increase the new escrow count and enables the controller board to again supply said control signal when the new escrow count again equals or exceeds said predetermined number; said controller board including switch means which can be actuated into first and second settings, wherein in the first setting said exit rollers are halted when the card is dispensed so as to hold an end of said card, and in the second setting said rollers continue, to ensure that the card completely exits the card dispenser.

8. The escrow vending machine according to claim 7 wherein said means which can be actuated includes a switch arrangement disposed on said controller board.

9. An escrow vending machine which accepts units of cash inserted by a customer and when a cash amount equaling a predetermined value has been so inserted, dispenses to the customer an article having said predetermined customer price, the escrow vending machine comprising:

a cabinet having an interior;

an article dispenser situated in the interior of said cabinet containing a supply of said articles and including means for dispensing said articles one at a time in response to a control signal applied to a control terminal therein;

a cash acceptor disposed in the interior of said cabinet for accepting units of cash and having an acceptor slot accessible through a penetration in said cabinet to accept and register said units of cash; said cash acceptor including means to generate a cash signal for each said unit of currency accepted in said cash acceptor; and a controller board integrated into said article dispenser having an input coupled to receive the cash signal from said cash acceptor and an output terminal supplying said control signal to said article dispenser, said controller board including escrow means for accumulating an escrow count of occurrences of said cash signal and for enabling the controller board to supply said control signal when the count in said escrow means equals or exceeds a preset count in said escrow means, and maintaining a difference between said escrow count and said predetermined number as a new escrow count; such that when additional units of cash are received in said cash acceptor and the latter produces additional cash signals, the escrow means continues to increase the new escrow count and enables the controller board to again supply said control signal when the new escrow count again equals or exceeds said predetermined number;

wherein said article dispenser has a base containing a dispensing mechanism, and includes a stack of said articles hat are fed one at a time into said dispensing mechanism, and wherein said controller board is fitted into the base of said article dispenser so that the article dispenser and the controller board are combined and integrated to form a self-contained, integrated assembly, such that said cash acceptor is connected directly to said article dispenser.

10. The escrow vending machine according to claim 9 wherein said controller board includes selection switch means permitting an authorized operator to set the predetermined number at which the controller board produces said control signal.

11. The escrow vending machine according to claim 10 wherein said selection switch includes a DIP switch having settings from "1" to "31".

12. The escrow vending machine according to claim 10 wherein said selection switch is disposed on an under side of the control board so as to be accessible by the operator from below the base of the article dispenser without removing the controller board from the article dispenser.

13. A self-contained fully integrated article dispenser and controller board assembly for dispensing articles to a customer who inserts cash into a cash acceptor, comprising an article dispenser adapted to be situated in the interior of a vending machine cabinet, and containing a supply of said articles and including means for dispensing said articles one at a time in response to a control signal applied to a control terminal thereof; and a controller board mounted within a base of said article dispenser so that the article dispenser and the control board are mechanically combined and integrated to form a fully self-contained mechanism, said control board having an input adapted to receive a cash signal from the cash acceptor and an output terminal supplying said control signal to the control terminal of said article dispenser, said controller board including escrow means for accumulating an escrow count of occurrences of said cash signal and for enabling the controller board to supply said control signal when the count in said escrow means equals or exceeds a preset count in said escrow means, and maintaining a difference between said escrow count and said predetermined number as a new escrow count; such that when additional units of cash are received in said cash acceptor and the later produces additional cash signals, the escrow means continues to increase the new escrow count and enable the controller board to again supply said control signal when the new escrow account again equals or exceeds said predetermined number.

14. The assembly of claim 13, wherein said controller board includes selection switch means permitting an authorized operator to set the predetermined number at which the controller board produces said signal and the article dispenser dispenses said article, said selection switch being disposed on an underside of said base so as to be accessible from beneath the base of said article dispenser without removing the controller board from the article dispenser.

* * * * *

UNITED STATES PATENT AND TRADEMARK OFFICE
CERTIFICATE OF CORRECTION

PATENT NO. : 5,868,237

DATED : Feb. 9, 1999

INVENTOR(S) : Rademacher et al.

It is certified that error appears in the above-identified patent and that said Letters Patent is hereby corrected as shown below:

Col 4, line 63:     "bash" should read --cash--

Col. 6, line 42:    "supple" should read --supply--

Col. 7, line 35:    "hat" should read --that--

Signed and Sealed this

Eighth Day of June, 1999

Attest:

Q. TODD DICKINSON

Attesting Officer    Acting Commissioner of Patents and Trademarks